United States Patent Office
3,069,431
Patented Dec. 18, 1962

3,069,431
PROCESS FOR PREPARING FLUORINE-SUBSTITUTED 2,5-DIHYDROTHIOPHENES
Carl G. Krespan, Wilmington, Del., assignor to E. I. du Pont de Nemours and Company, Wilmington, Del., a corporation of Delaware
No Drawing. Filed Aug. 28, 1959, Ser. No. 836,620
3 Claims. (Cl. 260—332.5)

This invention relates to, and has as its principal object the provision of, a novel process for the preparation of certain fluorine-substituted 2,5-dihydrothiophenes.

Fluorine-containing organic compounds have achieved important technical uses in recent years because of unusual physical and chemical properties. Many of these compounds are highly stable to heat and chemical reagents and are valuable for applications ranging from refrigerants to highly inert plastics. Consequently, the production of fluorinated organic compounds by simple and economical methods has been the objective of much recent research.

It has now been found that fluoro compounds of high thermal stability can be prepared by reacting sulfur at 250–400° C. with a perhalofluorocyclobutene of the formula

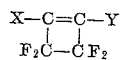

where X and Y are fluorine or chlorine. The resultant fluoro compounds conform to the formula

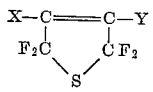

where X and Y are fluorine or chlorine.

The perchlorofluorodihydrothiophenes conforming to the above formula wherein X and/or Y may be chlorine or fluorine are very stable at temperatures up to 300° C. and even higher in some cases. This stability provides a sharp contrast with compounds of similar type bearing chlorine on the carbons alpha to the sulfur, e.g., perchloro-2,5-dihydrothiophene, a compound unstable at 160° C.

A convenient way of carrying out the above reaction consists in heating approximately equimolar amounts of sulfur and the perhalofluorocyclobutene in a closed system at a temperature of about 300° C. followed by isolation of the reaction product by any well-recognized process such as distillation. The reaction can also be accomplished in other types of apparatus such as in a continuous flow system at atmospheric, subatmospheric or superatmospheric pressure, wherein perhalofluorocyclobutene as described above is cycled through or over liquified sulfur with or without continuous separation and removal of the fluorinated product. Regardless of the process used, the unchanged perhalofluorocyclobutene may be reused.

The reactor, or the lining of the reactor, may be constructed of any material that is resistant to sulfur and organic fluorine compounds under the conditions of the reaction. Various stainless steel alloys, nickel or high nickel alloys such as "Hastelloy" B, and platinum or platinum alloys are useful for this purpose.

The temperature of the reaction may vary between wide limits, but 250–350° C. is the preferred range when a bomb-type reactor is used. In a continuous flow system, even higher temperatures such as 400° C. may be used. The pressure under which the reaction is conducted is not critical and may vary from subatmospheric to about 200 atmospheres, or even higher depending on the type of reactor used, the reaction temperature, and reaction time.

For reasons of economy, the reactants are usually used in approximately equimolar ratios. In some cases, however, such as when the reaction is carried out in a flow system, the ratio of reactants in the reaction zone may vary between wide limits.

The process of this invention may be carried out in the presence of catalysts such as iodine, though catalysts are usually not necessary. A solvent or medium for the reaction is not necessary. The reaction in some instances may, however, be facilitated through the use of an inert reaction medium such as carbon disulfide.

The perhalofluorocyclobutenes used as raw materials in this invention may be produced generally as described in U.S. Patent 2,436,142.

The products are referred to as perhalofluorodihydrothiophenes, the names being based on the hydrogen analog, 2,5-dihydrothiophene,

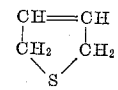

The Geneva system of nomenclature with the names based on 1-thiacyclopentene-3 could be used; thus

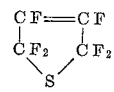

would be named 2,2,3,4,5,5-hexafluoro-1-thiacyclopentene-3.

The invention is more specifically illustrated but not limited by the following examples.

Example I

A mixture of 6.4 g. of sulfur (0.20 mole), 2.5 g. of iodine (0.01 mole) and 32 g. of hexafluorocyclobutene (0.20 mole) was heated with agitation at 300° C. under autogenous pressure for 10 hours in an 80-ml. tube lined with stainless steel. The pressure developed initially at 300° C. was 75 atmospheres and it dropped to 50 atmospheres during the 10-hours period. The reactor was then cooled and the crude reaction mixture was discharged and distilled giving 8.7 g. of hexafluoro-2,5-dihydrothiophene, B.P. 40–42° C.

*Analysis.*—Calc'd. for $C_4F_6S$: C, 24.75; F, 58.73; S, 16.52. Found: C, 24.96; F, 59.19; S, 16.57.

Support for the structure

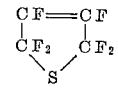

for the liquid was obtained from nuclear magnetic resonance and infrared spectra (C=C at 5.6μ).

Hexafluorocyclobutene may be prepared as described in Example I of U.S. Patent 2,436,142 as follows:

Chlorotrifluoroethylene is heated in an autoclave at 200° for 11 hours to give dichlorohexafluorocyclobutane, boiling at 58–59° C. in high yield. Dichlorohexafluorocyclobutane is then treated in absolute ethanol with zinc dust, with mild warming, to yield hexafluorocyclobutene, B.P. 5–6° C., in 94% yield.

Example II

A mixture of 40.0 g. of sulfur (1.25 moles) and 162 g. of hexafluorocyclobutene (1.0 mole) was heated with agitation in a 1-liter stainless steel-lined bomb at 300° C. under autogenous pressure for 15 hours. The crude reaction mixture weighing 192 g. was distilled to give 169 g. of hexafluoro-2,5-dihydrothiophene boiling at 42–43° C. The yield represents the conversion of 87% of the hexafluorocyclobutene.

A 10% solution of high molecular weight polythiocarbonyl fluoride in hexafluoro-2,5-dihydrothiophene was prepared. The solution was clear and viscous. A similar solution wherein chloroform was used as the solvent was gelatinous.

Polythiocarbonyl fluoride may be prepared as described in the Middleton U.S. Patent 2,980,695, issued April 18, 1961, as follows:

Tetrafluoro-1,3-dithietane,

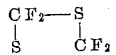

is pyrolyzed at 500° C. to give thiocarbonyl fluoride, $CF_2S$, boiling at −54° C. in 85% yield. Thiocarbonyl fluoride is then polymerized by passing 18 g. of $CF_2S$ vapor into 50 ml. of dry diethyl ether containing 0.02 ml. of a saturated solution of sodium cyanide in dimethylformamide at a temperature of −80° C. The polymerization vessel is held at −80° C. for 20 hours and the polythiocarbonyl fluoride isolated as a white, tough, spongy solid.

In another experiment, which shows that hexafluoro-2,5-dihydrothiophene can be used as a fire-extinguishing agent, two cotton wads about 0.5 inch square were each wet with 1 ml. of xylene, placed in small dishes and ignited. When the fires were burning well, a 0.2-ml. portion of hexafluoro-2,5-dihydrothiophene was squirted onto each wad of flaming cotton. In both cases, the fires were extinguished immediately. Hexafluoro-2,5-dihydrothiophene may also be used as a heat-transfer fluid and as a dielectric.

*Example III*

A mixture of 39.0 g. (0.20 mole) of 1,2-dichloro-3,3,4,4-tetrafluorocyclobutene-1,

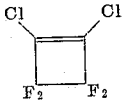

and 9.6 g. (0.30 mole) of sulfur was heated at 300° C. for 8 hours under autogenous pressure in a 500-ml. bomb to give 41 g. of solid and liquid product. The liqiud was decanted and distilled to give 14.8 g. (38%) of recovered 1,2-dichloro-3,3,4,4-tetrafluorocyclobutene-1, B.P. 67–68° C. and 7.9 g. (17% conversion) of 3,4-dichloro-2,2,5,5-tetrafluoro-2,5-dihydrothiophene, B.P. 115–116° C.

*Analysis.*—Calc'd. for $C_4Cl_2F_4S$: C, 21.16; Cl, 31.24; F, 33.48; S, 14.12. Found: C, 21.26; Cl, 31.26; F, 33.37; S, 14.45.

The structure

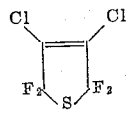

was supported by n-m-r (single fluorine peak in expected location) and infrared (C=C at 6.05μ) spectra.

1,2-dichloro-3,3,4,4 - tetrafluorocyclobutene - 1 may be prepared as described by Henne et al. [J. Am. Chem. Soc. 69, 279–281 (1947)] as follows:

Unsymmetrical dichlorodifluoroethylene is dimerized by heating under autogenous pressure at 200° C. to give 1,1,2,2-tetrachloro-3,3,4,4-tetrafluorocyclobutane in high yield. This is then dechlorinated with zinc in hot alcohol (see Example I) to give 1,2-dichloro-3,3,4,4-tetrafluorocyclobutene-1, B.P. 67° C.

The products of the process of this invention are highly inert and they do not support combustion. Accordingly, they may be used as heat-transfer agents and as fire extinguishing agents, as shown for instance in Example II, above. These products are also active solvents for certain fluorinated polymers e.g., of polythiocarbonyl fluoride, and may be employed in part or as the complete solvent for making solutions of said polymers useful for applying protective or water-repellent coatings to substrates such as wood, steel, aluminum, and fabrics. These solutions can also be used for casting films, and for extruding fibers.

Since obvious modifications and equivalents in the invention will be evident to those skilled in the chemical arts, I propose to be bound solely by the appended claims.

The embodiments of the invention in which an exclusive property or privilege is claimed are defined as follows.

I claim:

1. The process of preparing a fluorine-substituted 2,5-dihydrothiophene which comprises reacting sulfur with a perhalofluorocyclobutene of the formula

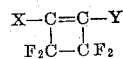

wherein X and Y are selected from the group consisting of chlorine and fluorine at a temperature of about 250–400° C.

2. The process of preparing hexafluoro-2,5-dihydrothiophene which comprises reacting sulfur with hexafluorocyclobutene at a temperature of about 250–400° C.

3. The process of preparing 3,4-dichloro-2,2,5,5-tetrafluoro-2,5-dihydrothiophene which comprises reacting sulfur with 1,2-dichloro-3,3,4,4-tetrafluorocyclobutene-1 at a temperature of about 250–400° C.

References Cited in the file of this patent

UNITED STATES PATENTS

| | | |
|---|---|---|
| 2,625,553 | Pines et al. | Jan. 13, 1953 |
| 2,932,651 | Ilgenfritz et al. | Apr. 13, 1960 |

OTHER REFERENCES

Hartough: Thiophene and Its Derivatives, 1952, Interscience Publishers, Inc., New York, N.Y., page 74.

UNITED STATES PATENT OFFICE
CERTIFICATE OF CORRECTION

Patent No. 3,069,431                                      December 18, 1962

Carl G. Krespan

It is hereby certified that error appears in the above numbered patent requiring correction and that the said Letters Patent should read as corrected below.

Column 3, lines 6 to 9, the formula should appear as shown below instead of as in the patent:

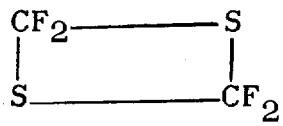

Signed and sealed this 3rd day of September 1963.

(SEAL)
Attest:

ERNEST W. SWIDER                                   DAVID L. LADD
Attesting Officer                                    Commissioner of Patents